July 12, 1966     B. R. WINBORN, JR     3,260,481

VARIABLE EFFECTIVE SPAN AIRPLANE

Filed June 29, 1964

BYRON R. WINBORN, JR.
INVENTOR.

BY Robert M. Sperry

ATTORNEY

United States Patent Office 3,260,481
Patented July 12, 1966

3,260,481
VARIABLE EFFECTIVE SPAN AIRPLANE
Byron R. Winborn, Jr., Irving, Tex., assignor to Ling-Temco-Vought, Inc., Dallas, Tex., a corporation of Delaware
Filed June 29, 1964, Ser. No. 378,557
5 Claims. (Cl. 244—42)

This invention relates to airplanes and is particularly directed to novel methods and apparatus for varying the effective wing span of airplanes.

As is well known, the efficiency of an airplane is inversely related to the induced drag on the airplane and it can be shown that the induced drag is inversely related to the effective wing span. Thus, in theory, an airplane can be made as efficient as possible by providing it with the largest possible wing span. For level, unaccelerated flight, this tends to be true. However, the wing root bending moment also increases when the wing span is increased and for accelerated flight, such as that during maneuvering the airplane, this rapidly becomes of greater concern than the efficiency. If the wing root bending moment is too great, the wings will be torn off of the airplane. Thus, for structural strength, the wing span should be made as small as possible. Obviously, in designing airplanes, these conflicting requirements on the wing span must be resolved or compromised in some manner.

Conventionally, this problem has been compromised by subordinating either efficiency or structural strength, depending on the purpose for which the airplane was intended. For example, commercial airliners and long range bombers are designed with relatively large wing spans to provide greater efficiency, but do not have sufficient structural strength to withstand violent maneuvers. In contrast, airplanes intended for short flights with severe maneuvers, such as crop dusters and military fighter airplanes, are designed with relatively small wing spans. Recently, attempts have been made to design airplanes having wings provided with portions which are mechanically movable to actually vary the wing span. However, because of the disadvantages inherent in doing this, the idea is feasible only for airplanes intended for performing very sophisticated missions. For example, this approach is currently being considered for several airplanes which are being designed to fly at speeds of approximately Mach 2 with minimum wing span but which will mechanically spread their wings for flight at lower speeds, such as during landing and takeoff.

The disadvantages of these approaches to the problem are obvious. Design compromise is merely passive submission to the problem, whereas mechanically variable wings impose such penalties in cost, weight and complexity that they can be considered only as a last resort. Thus, no satisfactory method or apparatus has been proposed heretofore for resolving this problem. However, these disadvantages are overcome with the present invention and novel methods and apparatus are provided for varying the effective wing span to provide maximum efficiency for cruising together with maximum strength for maneuvering. Furthermore, the apparatus of the present invention is simple, inexpensive, and uncomplicated and adds little, if any, additional weight to the airplane.

The advantages of the present invention are preferably attained by designing an airplane with tail surfaces mounted on booms outboard of the wings and having the center of gravity of the airplane located to load the tail surfaces, during unaccelerated flight, to provide additional lift and, hence, increase the effective wing span. In addition, high lift flaps are provided on the wings and means are provided to deflect the flaps during accelerated flight to reduce the tail loading and effective wing span without varying the actual wing span of the airplane.

Accordingly, it is an object of the present invention to provide novel methods and apparatus for varying the effective wing span of an airplane.

Another object of the present invention is to provide novel methods and apparatus for varying the effective wing span of an airplane which are simple, inexpensive, uncomplicated and add little, if any, weight to the airplane.

A further object of the present invention is to provide novel methods and apparatus for varying the effective wing span of an airplane without varying the actual wing span of the airplane.

A specific object of the present invention is to provide an airplane having the tail surfaces mounted on booms outboard of the wings together with flaps on the main wings and employing said flaps to load the tail surfaces to provide additional lift and increase the effective wing span, during cruise, and to reduce the tail loading and effective wing span during maneuvers.

These and other objects and features of the present invention will be apparent from the following detailed description taken with reference to the figures of the accompanying drawing.

Figure 1:
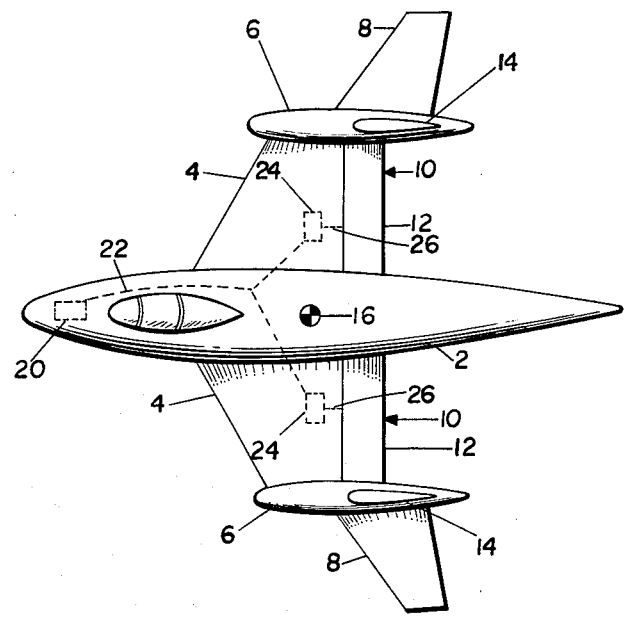
FIGURE 1 is a plan view of an airplane embodying the present invention.
Figure 2:
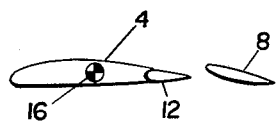
FIGURE 2 is a diagrammatic view showing the relationship of the wing and tail of the airplane of FIGURE 1, showing the flap in the cruise position.

In the form of the present invention chosen for purposes of illustration in the drawing, FIGURE 1 shows an airplane having a fuselage 2 with aerodynamic wings 4 of relatively small span. Booms 6 are mounted outboard of the wings 4 and tail surfaces 8 extend outwardly therefrom adjacent the trailing edges 10 of the wings 4. Moreover, high lift flaps 12 are provided on the trailing edges 10 of the wings 4. Vertical stabilizers 14 may be provided on the booms 6. Alternatively, the tail surfaces 8 may be mounted at a substantial dihedral to serve as V tails, or a single vertical stabilizer may be provided on the fuselage 2. The specific form and location of the vertical stabilizers have little, if any, effect on the present invention and, consequently, may be determined by other factors.

According to the present invention, the airplane is balanced so that the center of gravity indicated at 16, is located farther aft on the mean aerodynamic chord than is normally desirable. As shown, the center of gravity 16 is located approximately at the midpoint of the chord of the wing 4. Because of this, when the airplane is flying level and at constant speed, the outboard tail surfaces 8 contribute substantially to the total amount of lift developed and the effective wing span approaches the total geometric span of the wings 4 plus the tail surfaces 8. Consequently, the induced drag is minimized and the efficiency of the airplane is enhanced. It will be apparent that, with this arrangement, the wing bending moment and wing torsion are relatively high with respect to the total amount of lift developed. However, since the lift required for level cruise at constant speed is equal merely to the weight of the airplane, the loading of the wings 4 and tail surfaces are quite moderate.

Figure 3:
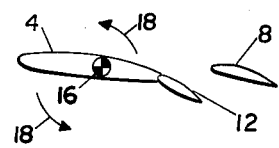
FIGURE 3 is a view similar to that of FIGURE 2 showing the flap in the maneuver position.

Maneuvering and other accelerated flight conditions normally occur during only small portions of a total flight time. However, during such portions, structural loading is of greater concern than efficiency, as noted above. Consequently, it is desirable to reduce the effective wing span. In accordance with the present invention, this is accomplished by deflecting the high lift flaps 12 on the trailing edges 10 of the wings 4. When the flaps 12 are deflected, the lift of the wings 4 is increased considerably. At the same time, a moment is set up about the center of gravity of the airplane, as indicated by arrows 18 in FIGURE 3, tending to cause the airplane to pitch nose downward and, thereby, tending to reduce the angle of attack of the tail surfaces and thereby relieve the lift loading of the tail surfaces 8. Hence, the amount of tail lift required to maintain balance during accelerated flight would not be much different than the tail lift required for unaccelerated flight. As a consequence, the effective wing span is reduced to approximately the geometric span of the wings 4 alone and the wing bending moment required to sustain the maneuver is similarly reduced. Another important advantage of the present invention is obtained from the fact that, as noted above, the wing lift increases much more rapidly than the tail lift as the airplane is maneuvered. This alleviates the tendency of outboard tail airplanes of the prior art to undergo tail stall prior to wing stall.

From the foregoing description, it will be seen that, in accordance with the present invention, the airplane can have maximum effective wing span and, hence, maximum efficiency for level, unaccelerated cruise, by flying with the flaps in a neutral or undeflected position, and can significantly reduce the effective wing span, by deflecting the flaps, to minimize structural loading during accelerated flight conditions.

Obviously, if desired, the wing flaps 12 may be manually actuated by the pilot upon entering and leaving a period of accelerated flight. Preferably, however, means will be provided to automatically actuate the flaps and, hence, free the pilot for other duties. For example, an accelerometer or the like, indicated in dotted lines at 20 in FIGURE 1, can be provided to sense accelerated flight conditions and to establish an electrical signal in response to such conditions. This signal may be supplied by conductor 22 to suitable servomechanisms 24 which act through linkage 26 to program the relative positions of the outboard tailing and the flaps 12 in the manner described.

Numerous other variations and modifications may also be made without departing from the present invention. Accordingly, it should be clearly understood that the form of the invention described and shown in the figures of the accompanying drawing are illustrative only and are not intended to limit the scope of the invention.

What is claimed is:
1. Apparatus for varying the effective wing span of an airplane, said apparatus comprising:
    a fuselage,
    wing means mounted in fixed relation with said fuselage,
    boom means mounted outboard of said wing means,
    tail surfaces, disposed at a positive angle of attack during unaccelerated flight, extending outward from said boom means and fixedly positioned to locate the center of gravity of said airplane to cause substantial lift loading of said tail surfaces, and
    means for increasing the lift of said wing means and for establishing a nose down moment about said center of gravity to reduce the angle of attack and thereby relieve the lift loading of said tail surfaces during accelerated flight conditions.
2. Apparatus for varying the effective wing span of an airplane, said apparatus comprising:
    a fuselage,
    wings extending oppositely from said fuselage in fixed relation therewith and positioned to locate the center of gravity of said airplane approximately at the midpoint of the chord of said wings,
    boom means mounted outboard of said wings,
    tail surfaces, disposed at a positive angle of attack during unaccelerated flight, extending outward from said boom means in fixed position adjacent the trailing edges of said wings to cause substantial lift loading of said tail surfaces,
    flap means positioned adjacent the trailing edges of said wings, and
    means for deflecting said flap means during accelerated flight conditions to increase the lift of said wings and to establish a nose down moment about said center of gravity to reduce the angle of attack and thereby relieve the lift loading of said tail surfaces and for neutralizing said flap means during unaccelerated flight conditions to cause lift loading of said total surfaces.
3. Apparatus for varying the effective wing span of an airplane, said apparatus comprising:
    a fuselage,
    wings extending oppositely from said fuselage,
    boom means mounted outboard of said wings,
    tail surfaces extending outward from said boom means adjacent the trailing edges of said wings,
    high lift flap means positioned adjacent the trailing edges of said wings, and
    means responsive ot accelerated flight conditions for deflecting said flap means and responsive to unaccelerated flight conditions for neutralizing said flap means.
4. Apparatus for varying the effective wing span of an airplane, said apparatus comprising:
    a fuselage,
    wings extending oppositely from said fuselage,
    boom means mounted outboard of said wings,
    tail surfaces extending outward from said boom means adjacent the trailing edges of said wings,
    high lift flap means positioned adjacent the trailing edges of said wings,
    servomechanism means for actuating said flap means, and
    accelerometer means supplying a signal to said servomechanism means to cause said servomechanism means to deflect said flap means during accelerated flight conditions and to neutralize said flap means during unaccelerated flight conditions.
5. The method of varying the effective wing span of an airplane having wings, flap means positioned adjacent the trailing edges of said wings, and tail surfaces mounted in fixed position outboard of said wings, said method comprising the steps of
    balancing said airplane to locate the center of gravity of said airplane at a point causing substantial lift loading of said tail surfaces during unaccelerated flight conditions, and
    deflecting said flap means during accelerated flight conditions to relieve the lift loading of said tail surfaces.

References Cited by the Examiner
UNITED STATES PATENTS

| | | | |
|---|---|---|---|
| 2,555,862 | 6/1951 | Romani | 244—42 |
| 2,568,021 | 9/1951 | Northrop | 244—42 |
| 2,576,294 | 11/1951 | Geraci | 244—45 X |
| 3,064,928 | 11/1962 | Toll | 244—43 X |
| 3,139,248 | 6/1964 | Calderon | 244—42 |
| 3,188,022 | 6/1965 | Ornberg | 244—45 |

FOREIGN PATENTS

| | | |
|---|---|---|
| 878,604 | 10/1943 | France. |
| 1,056,482 | 4/1959 | Germany. |

MILTON BUCHLER, *Primary Examiner.*

B. BELKIN, *Assistant Examiner.*